(12) United States Patent
Tanaka et al.

(10) Patent No.: US 12,477,508 B2
(45) Date of Patent: Nov. 18, 2025

(54) RETRIEVAL APPARATUS, RETRIEVAL METHOD, AND NON-TRANSITORY STORAGE MEDIUM

(71) Applicant: NEC Corporation, Tokyo (JP)

(72) Inventors: Tomoaki Tanaka, Tokyo (JP); Norihiro Ide, Tokyo (JP); Kouichi Ono, Tokyo (JP); Tsukasa Kasuya, Tokyo (JP); Aoi Uzuki, Tokyo (JP); Yukiko Oka, Tokyo (JP); Masataka Nishida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 347 days.

(21) Appl. No.: 18/031,472

(22) PCT Filed: Oct. 21, 2020

(86) PCT No.: PCT/JP2020/039503
§ 371 (c)(1),
(2) Date: Apr. 12, 2023

(87) PCT Pub. No.: WO2022/085102
PCT Pub. Date: Apr. 28, 2022

(65) Prior Publication Data
US 2023/0379869 A1    Nov. 23, 2023

(51) Int. Cl.
*H04W 64/00* (2009.01)
*H04W 4/021* (2018.01)

(52) U.S. Cl.
CPC ......... *H04W 64/006* (2013.01); *H04W 4/021* (2013.01)

(58) Field of Classification Search
CPC ............................ H04W 64/006; H04W 4/021
See application file for complete search history.

(56) References Cited

U.S. PATENT DOCUMENTS

2013/0018951 A1*  1/2013  Piccinini ............ H04L 65/1063
                                                                   709/204
2018/0143025 A1    5/2018  Kurata et al.

FOREIGN PATENT DOCUMENTS

| JP | 2009-186182 A | 8/2009 |
| JP | 2011-034200 A | 2/2011 |
| JP | 2013-096923 A | 5/2013 |
| JP | 2014-048047 A | 3/2014 |
| JP | 2014-066605 A | 4/2014 |
| JP | 2017-026568 A | 2/2017 |
| JP | 2019-149854 A | 9/2019 |

OTHER PUBLICATIONS

JP Office Action for JP Application No. 2022-556284, mailed on Jun. 4, 2024 with English Translation.
International Search Report for PCT Application No. PCT/JP2020/039503, mailed on Jan. 19, 2021.

\* cited by examiner

*Primary Examiner* — Curtis B Odom
(74) *Attorney, Agent, or Firm* — Sughrue Mion, PLLC

(57) ABSTRACT

The present invention provides a retrieval apparatus (10) including: a search condition acquisition unit (11) acquiring a search condition specifying a plurality of starting points; a selection unit (12) selecting, from among a plurality of preregistered facilities, one or a plurality of facilities to be one or a plurality of meeting places from the plurality of starting points, based on the plurality of starting points and a crowdedness state of a public transportation means; and a notification unit (13) notifying a facility selected as the meeting place to a user.

13 Claims, 12 Drawing Sheets

FIG. 3

| FACILITY IDENTIFICATION INFORMATION | FACILITY NAME | POSITIONAL INFORMATION | . . . . |
|---|---|---|---|
| M013725 | CHINESE COOKING STYLE | $(x_1, y_1)$ | . . . . |
| M021811 | QB BOWLING | $(x_2, y_2)$ | . . . . |
| ⋮ | ⋮ | ⋮ | . . . . |
| M111327 | HEAD OFFICE BUILDING | $(x_3, y_3)$ | . . . . |
| ⋮ | ⋮ | ⋮ | . . . . |

FIG. 4

| FACILITY IDENTIFICATION INFORMATION | STARTING POINT 1 | STARTING POINT 2 | ... |
|---|---|---|---|
| M013725 | ROUTE: *** DISTANCE: $L_{11}$ TIME: $T_{11}$ COST: $C_{11}$ | ROUTE: *** DISTANCE: $L_{12}$ TIME: $T_{12}$ COST: $C_{12}$ | ... |
| M021811 | ROUTE: *** DISTANCE: $L_{21}$ TIME: $T_{21}$ COST: $C_{21}$ | ROUTE: *** DISTANCE: $L_{22}$ TIME: $T_{22}$ COST: $C_{22}$ | ... |
| ... | ... | ... | |

FIG. 11

| FACILITY IDENTIFICATION INFORMATION | FACILITY NAME | POSITIONAL INFORMATION | PURPOSE OF USE | ... |
|---|---|---|---|---|
| M013725 | CHINESE COOKING STYLE | $(x_1, y_1)$ | EATING AND DRINKING, ENTERTAINMENT, DATE, PARTY | ... |
| M021811 | QB BOWLING | $(x_2, y_2)$ | AMUSEMENT | ... |
| ... | ... | ... | ... | ... |
| M111327 | HEAD OFFICE BUILDING | $(x_3, y_3)$ | CONFERENCE | ... |
| ... | ... | ... | ... | ... |

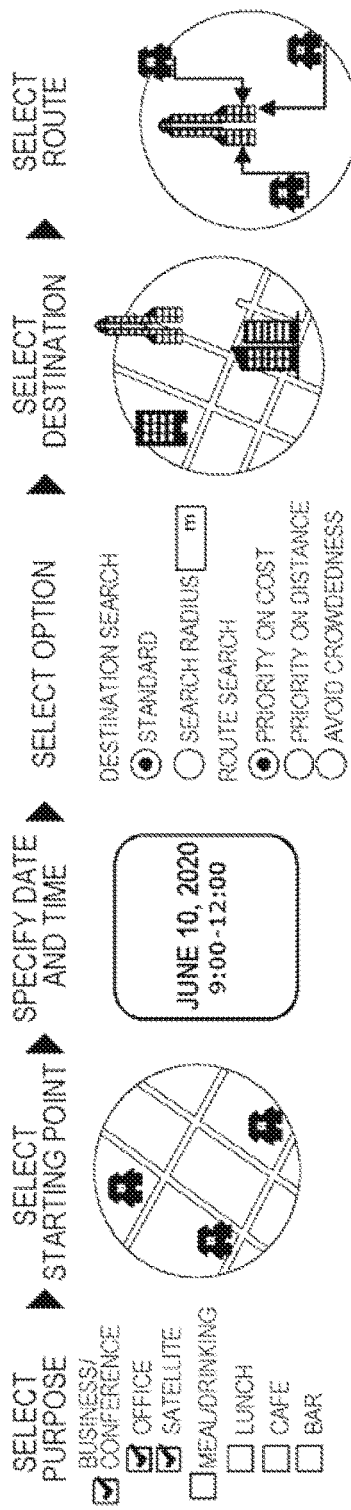

RETRIEVAL APPARATUS, RETRIEVAL METHOD, AND NON-TRANSITORY STORAGE MEDIUM

This application is a National Stage Entry of PCT/JP2020/039503 filed on Oct. 21, 2020, the contents of all of which are incorporated herein by reference, in their entirety.

TECHNICAL FIELD

The present invention relates to a retrieval apparatus, a retrieval method, and a program.

BACKGROUND ART

Patent Documents 1 and 2 disclose technologies related to the present invention.

Patent Document 1 discloses a technology for computing a meeting place of a plurality of vehicles. The technology computes a meeting place being excellent in terms of travel distance, travel time, or cost, based on positional information of each of the plurality of vehicles.

Patent Document 2 discloses a technology for, when acquiring the current positions of a plurality of persons, selecting a conference room located almost at the center of the current positions of the plurality of persons as a conference room where the plurality of persons can conveniently gather.

RELATED DOCUMENT

Patent Document

Patent Document 1: Japanese Patent Application Publication No. 2014-048047
Patent Document 2: Japanese Patent Application Publication No. 2017-026568

DISCLOSURE OF THE INVENTION

Technical Problem

The present inventors have investigated a technology for computing a suitable meeting place in consideration of travel using a public transportation means. Then, the present inventors have newly found the following issue.

It may be preferable to avoid use of a crowded public transportation means from viewpoints of infection prevention of an infectious disease, stress reduction, and the like. By searching for a suitable meeting place in consideration of such viewpoints, a meeting place better satisfying user needs can be retrieved. Neither of Patent Documents describes or suggests a technology for retrieving a suitable meeting place in consideration of such viewpoints.

An object of the present invention is to retrieve a meeting place satisfying user needs by an unprecedented technique.

Solution to Problem

A retrieval apparatus according to an example aspect of the invention includes:
 a search condition acquisition unit that acquires a search condition specifying a plurality of starting points;
 a selection unit that selects, from among a plurality of preregistered facilities, one or a plurality of facilities to be one or a plurality of meeting places from the plurality of starting points, based on the plurality of starting points and a crowdedness state of a public transportation means; and
 a notification unit that notifies a facility selected as the meeting place to a user.

Further, a retrieval method according to an example aspect of the invention includes, by a computer:
 acquiring a search condition specifying a plurality of starting points;
 selecting, from among a plurality of preregistered facilities, one or a plurality of facilities to be one or a plurality of meeting places from the plurality of starting points, based on the plurality of starting points and a crowdedness state of a public transportation means; and
 notifying a facility selected as the meeting place to a user.

Further, a program according to an example aspect of the invention, causing a computer to function as:
 a search condition acquisition unit that acquires a search condition specifying a plurality of starting points;
 a selection unit that selects, from among a plurality of preregistered facilities, one or a plurality of facilities to be one or a plurality of meeting places from the plurality of starting points, based on the plurality of starting points and a crowdedness state of a public transportation means; and
 a notification unit that notifies a facility selected as the meeting place to a user.

Advantageous Effects of Invention

The present invention enables retrieval of a meeting place satisfying user needs by an unprecedented technique.

BRIEF DESCRIPTION OF THE DRAWINGS

FIG. 3 is a diagram schematically illustrating an example of information processed by the retrieval apparatus according to the present example embodiment.

FIG. 4 is a diagram schematically illustrating an example of information processed by the retrieval apparatus according to the present example embodiment.

FIG. 11 is a diagram schematically illustrating an example of information processed by the retrieval apparatus according to the present example embodiment.

FIG. 12 is a diagram schematically illustrating an example of a screen output by the retrieval apparatus according to the present example embodiment.

DESCRIPTION OF EMBODIMENTS

Example embodiments of the present invention will be described below by using drawings. Note that in every drawing, similar components are given similar signs, and description thereof is omitted as appropriate.

First Example Embodiment

Overview

A retrieval apparatus according to the present example embodiment has a function of retrieving a facility suitable as a meeting place for a plurality of persons at a plurality of starting points from among a plurality of preregistered facilities and notifying the facility to a user. The retrieval apparatus uses information indicating a crowdedness state of a public transportation means in the retrieval. The retrieval apparatus retrieves a facility best equalizing a burden among all persons in terms of distance, time, or cost for traveling by using a public transportation means the crowdedness state of which satisfies a predetermined condition (such as a public transportation means not being crowded at a reference level or higher) and selects the facility as a meeting place.

Configuration

Next, a configuration of the retrieval apparatus will be described. First, an example of a hardware configuration of the retrieval apparatus will be described. Each functional unit in the retrieval apparatus is provided by any combination of hardware and software centered on a central processing unit (CPU), a memory, a program loaded into the memory, a storage unit, such as a hard disk, storing the program [capable of storing not only a program previously stored in the shipping stage of the apparatus but also a program downloaded from a storage medium such as a compact disc (CD) or a server on the Internet], and a network connection interface in any computer. Then, it may be understood by a person skilled in the art that various modifications to the providing method and the apparatus can be made.

Figure 1:
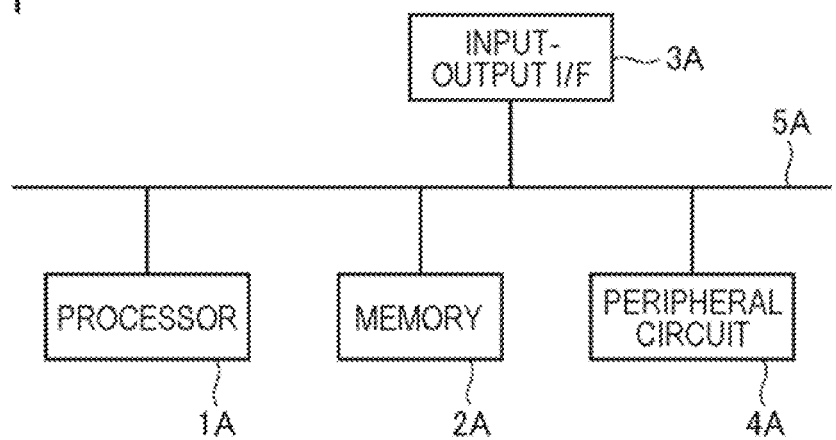
FIG. 1 is an example of a hardware configuration of a retrieval apparatus according to the present example embodiment.

FIG. 1 is a block diagram illustrating a hardware configuration of the retrieval apparatus. As illustrated in FIG. 1, the retrieval apparatus includes a processor 1A, a memory 2A, an input-output interface 3A, a peripheral circuit 4A, and a bus 5A. Various modules are included in the peripheral circuit 4A. The retrieval apparatus may not include the peripheral circuit 4A. Note that the retrieval apparatus may be configured with a plurality of physically and/or logically separate apparatuses or may be configured with one physically and/or logically integrated apparatus. When the retrieval apparatus is configured with a plurality of physically and/or logically separate apparatuses, each of the plurality of apparatuses may include the aforementioned hardware configuration.

The bus 5A is a data transmission channel for the processor 1A, the memory 2A, the peripheral circuit 4A, and the input-output interface 3A to transmit and receive data to and from one another. Examples of the processor 1A include arithmetic processing units such as a CPU and a graphics processing unit (GPU). Examples of the memory 2A include memories such as a random-access memory (RAM) and a read-only memory (ROM). The input-output interface 3A includes an interface for acquiring information from an input apparatus, an external apparatus, an external server, an external sensor, a camera, and the like, and an interface for outputting information to an output apparatus, the external apparatus, the external server, and the like. Examples of the input apparatus include a keyboard, a mouse, a microphone, a physical button, and a touch panel. Examples of the output apparatus include a display, a speaker, a printer, and a mailer. The processor 1A issues an instruction to each module and can perform an operation, based on the operation result by the module.

Next, a functional configuration of the retrieval apparatus will be described. For example, the retrieval apparatus is a server. The retrieval apparatus is connected to a client terminal (such as a personal computer, a smartphone, a tablet terminal, a smartwatch, and a mobile phone) through a wired and/or wireless communication network (such as the Internet). Then, the retrieval apparatus acquires a search condition from the client terminal, executes predetermined retrieval processing, based on the search condition, and returns the retrieval result to the client terminal.

Figure 2:
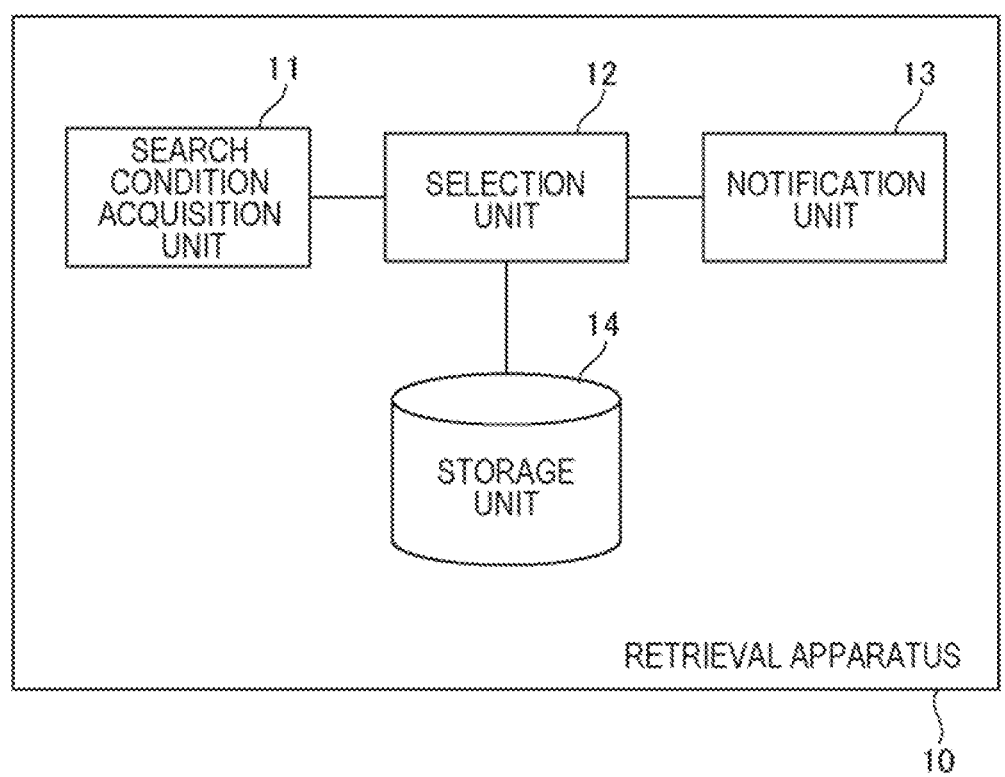
FIG. 2 is an example of a functional block diagram of the retrieval apparatus according to the present example embodiment.

FIG. 2 illustrates an example of a functional block diagram of a retrieval apparatus 10. As illustrated, the retrieval apparatus 10 includes a search condition acquisition unit 11, a selection unit 12, a notification unit 13, and a storage unit 14. Note that the retrieval apparatus 10 may not include the storage unit 14. In this case, an external apparatus configured to be communicable with the retrieval apparatus 10 includes the storage unit 14 and is configured to allow access to the storage unit 14 from the retrieval apparatus 10. A configuration of each functional unit will be described in detail below.

The search condition acquisition unit 11 acquires a search condition. The search condition acquisition unit 11 may acquire a search condition from a client terminal. For example, a user performs input for specifying a search condition by operating the client terminal. The client terminal transmits the specified search condition to the retrieval apparatus 10.

A plurality of starting points are specified by a search condition. For example, a starting point is determined by positional information such as latitude-longitude. A travel means may be further specified by a search condition.

There are various means for providing input for specifying a starting point. For example, the client terminal may display a map and accept input for specifying a starting point on the map. In addition, the client terminal may accept, as input for specifying a starting point, input of related information (such as an address, a facility name, and a phone number) associated with positional information (such as latitude-longitude information) of each of a plurality of points.

In addition, the client terminal may accept input for selecting one from among preregistered candidates of a starting point. In this case, candidates of a starting point are preregistered in the retrieval apparatus 10. For example, a point formerly used as a starting point may be registered as a candidate of a starting point. Alternatively, a user may register a location of the home of the user or a company by any means as a candidate of a starting point. In addition, the client terminal may accept input for selecting one from among preregistered stations and/or bus stops. Note that the exemplifications are strictly examples, and input for specifying a starting point is not limited to the exemplifications.

Examples of a travel means include "walking," "a public transportation means," and "a vehicle." A travel means may be specified by a search condition for each starting point, that is, for each person starting from each starting point. In addition, only one travel means may be specified by a search condition regardless of the number of specified starting points. In the latter case, retrieval is executed on the assumption that every person starting from each starting point travels by the specified travel means.

Note that a travel means may not be specified by a search condition. In this case, retrieval is executed on the assumption that a person travels by a travel means preset as a default value. Further, a condition other than the exemplified conditions may be specified by a search condition. Other conditions will be described as appropriate below.

The selection unit 12 selects, from among a plurality of preregistered facilities, one or a plurality of facilities to be one or a plurality of meeting places from a plurality of starting points, based on a plurality of starting points specified by a search condition and the crowdedness state of a public transportation means.

First, "a plurality of preregistered facilities" will be described. The facility is a facility suitable for persons to gather. A type of facility to be registered depends on the purpose of the retrieval service. For example, facilities that may be used by every person, such as a restaurant, an amusement facility, a library, and a station may be registered. In addition, facilities that may be used only by specific persons, such as a company office and a private home may be registered. Registration of facilities may be performed by a servicer of the retrieval service. Further, a user of the retrieval service may be able to register any facility (such as a company office to which the user belongs or a home of a friend) for retrieval by the user.

FIG. 3 schematically illustrates an example of information about a plurality of preregistered facilities. For example, the storage unit 14 stores the information. Facility identification information for identifying each of the plurality of registered facilities, a facility name, and positional information (such as latitude-longitude) of each facility are associated with each other in the illustrated information.

Next, "the crowdedness state of a public transportation means" will be described. Examples of a public transportation means include a subway, an electric train, a steam train, a bus, an airplane, and a ship. The selection unit 12 acquires information indicating the crowdedness state of a public transportation means. When a meeting date and time or the like is specified by a search condition, the selection unit 12 can acquire information indicating the crowdedness state at the date and time or a time close to the date and time. When a meeting date and time or the like is not specified by a search condition, the selection unit 12 may acquire information indicating the crowdedness state at the present time. A service recognizing the crowdedness state of a public transportation means at the present time and notifying the state to the user, and predicting the crowdedness state in the future and notifying the state to the user is widely used. Acquisition of information indicating the crowdedness state of a public transportation means by the selection unit 12 can be provided by, for example, using the technologies described above. The selection unit 12 may acquire the information from an external apparatus. In addition, the selection unit 12 may generate the information by using the aforementioned technologies. For example, a crowdedness state may be indicated by a passenger load factor (the ratio of the number of passengers to a reference capacity). In addition, a crowdedness state may be indicated by a predetermined criterion (matter of design) such as "almost empty," "so uncrowded as to allow each passenger to be seated," and "crowded."

Note that a crowdedness trend statistically generated from past crowdedness state records may be used as information indicating a crowdedness state. The following example may be considered as a method of generating a crowdedness trend. First, a record of a crowdedness state is accumulated as appropriate. Then, one day is segmented into time slots each including about 30 minutes to one hour, and a crowdedness trend is computed for each segment by using the mean value or the like of past crowdedness states included in the segment. Note that a crowdedness trend may be computed separately for weekdays and holidays. Further, a crowdedness trend may be computed separately for each day of the week. Furthermore, a crowdedness trend may be computed separately for each season.

Next, "processing of selecting one or a plurality of facilities to be one or a plurality of meeting places" will be described. For traveling by using a public transportation means the crowdedness state of which satisfies a predetermined condition, the selection unit 12 retrieves a facility best equalizing a burden among all persons (a plurality of persons starting from a plurality of starting points, respectively) in terms of distance, time, or cost and selects the facility as a meeting place. For example, "a predetermined condition" is "the crowdedness state being lower than a reference level." While there are various algorithms for providing the selection, an example will be described below.

In the example, the selection unit 12 executes:
 first processing of retrieving an optimum route for traveling from each of a plurality of starting points to each of a plurality of preregistered facilities and
 second processing of retrieving, from among the plurality of preregistered facilities, a facility best equalizing a burden among all persons in terms of distance, time, or cost, the burden being determined based on the optimum routes.

Details will be described below.

In the first processing, an optimum route is retrieved for each pair of each of the plurality of starting points and each of the plurality of preregistered facilities. A facility being a target of the processing may be every one of the plurality of preregistered facilities. In addition, the selection unit 12 may extract part of the plurality of preregistered facilities as a candidate of a meeting place by a predetermined means and set the extracted part as a target of the processing. In this case, the other part of the facilities not being extracted is not a target of the processing. Details of the means for extracting part of the facilities as a target of the processing will be described in the following example embodiment.

In retrieval of an optimum route, the selection unit 12 takes the crowdedness state of a public transportation means into consideration. First, based on acquired information indicating the crowdedness state of a public transportation means, the selection unit 12 determines a public transportation means the crowdedness state of which is lower than a reference level (such as the passenger load factor being lower than 70% or being "so uncrowded as to allow each passenger to be seated" or lower). Note that the reference level may be a preset fixed value or may be set and changed by each user.

Then, for traveling by using a public transportation means the crowdedness state of which satisfies the predetermined condition, the selection unit 12 retrieves an optimum route for traveling from each of the plurality of starting points to each of the plurality of preregistered facilities. When a travel means is specified by a search condition, the selection unit 12 retrieves an optimum route for traveling by the travel means.

"A public transportation means the crowdedness state of which satisfies the predetermined condition" is a public transportation means the crowdedness state of which is lower than the reference level. In other words, the selection unit 12 retrieves an optimum route for traveling from each of the plurality of starting points to each of the plurality of preregistered facilities when a public transportation means the crowdedness state of which is lower than the reference level is used (in other words, when a public transportation means the crowdedness state of which is the reference level or greater is not used).

When a public transportation means the crowdedness state of which is lower than the reference level does not exist, the selection unit 12 may retrieve "an optimum route when the least crowded public transportation means is used," may retrieve "an optimum route when a predetermined number of public transportation means in ascending order of crowdedness are used," or may retrieve "an optimum route when a public transportation means the crowdedness state of which is lower than an upper limit level is used." In other words, when a public transportation means the crowdedness state of which is lower than the reference level does not exist, "the least crowded public transportation means," "a predetermined number of public transportation means in ascending order of crowdedness," "a public transportation means the crowdedness state of which is lower than an upper limit level," or the like may be selected as a public transportation means the crowdedness state of which satisfies the predetermined condition. The crowdedness level of the aforementioned upper limit level is higher than that of the aforementioned reference level. For example, the passenger load factor at the upper limit level is 80%, and the passenger load factor at the reference level is 70%. Note that when a public transportation means the crowdedness state of which is lower than the reference level does not exist, the selection unit 12 may retrieve "an optimum route when a public transportation means is not used."

For example, an optimum route is a route minimizing the travel distance, a route minimizing the travel time, or a route minimizing the cost required for travel. Which of a travel distance, a travel time, and a cost has priority may be specified by a search condition. Then, the selection unit 12 may determine a route minimizing the value of the specified item as an optimum route. Note that traffic jam information of a road may be used in computation of a travel time. Computation of an optimum route and computation of the travel distance, the travel time, and the cost of each route can be provided by using conventional technologies.

By the processing up to this point, an optimum route when a public transportation means the crowdedness state of which is lower than the reference level is used is determined for each pair of each of the plurality of starting points and each of the plurality of preregistered facilities, and the travel distance, the travel time, and the cost of the route are computed, as illustrated in FIG. 4.

Next, in the second processing, the selection unit 12 selects a facility to be a meeting place, based on at least one of the travel distance, the travel time, and the cost of the aforementioned determined optimum route for traveling from each of the plurality of starting points to each of the plurality of preregistered facilities. The selection unit 12 may select a facility as a meeting place from among the plurality of preregistered facilities, a degree of variation in at least one of the travel distance, the travel time, and the cost for traveling from each of the plurality of starting points to the facility satisfying a predetermined condition. Which of a travel distance, a travel time, and a cost has priority may be specified by the search condition. Then, the selection unit 12 may select a predetermined facility as a meeting place, based on a degree of variation in the value of the specified item.

While a degree of variation is preferably indicated by a range of values (the difference between a maximum value and a minimum value), another indicator may be used. For each preregistered facility, the travel distance, the travel time, the cost, and the like for traveling from each of a plurality of starting points to the facility is computed, as illustrated in FIG. 4. For each of the preregistered facility, the selection unit 12 computes a degree of variation in the travel distance for traveling from each of the plurality of starting points to the facility, a degree of variation in the travel time for traveling from each of the plurality of starting points to the facility, or a degree of variation in the cost for traveling from each of the plurality of starting points to the facility.

Examples of a facility for which a degree of variation satisfies a predetermined condition include "a facility for which a degree of variation (such as a range of values) is equal to or less than a threshold value" and "a facility for which a degree of variation (a range of values) is included in a predetermined number of degrees of variation in ascending order."

Returning to FIG. 2, the notification unit 13 notifies one or a plurality of facilities selected as one or a plurality of meeting places to a user. The notification unit 13 transmits information indicating the one or the plurality of facilities selected as one or a plurality of meeting places to the client terminal. The client terminal outputs the acquired information to a display.

For example, the client terminal may display an image in which information (such as a name, an address, a phone number, and/or a thumbnail image) about the one or the plurality of facilities selected as one or a plurality of meeting places is displayed in list form.

Figure 5:
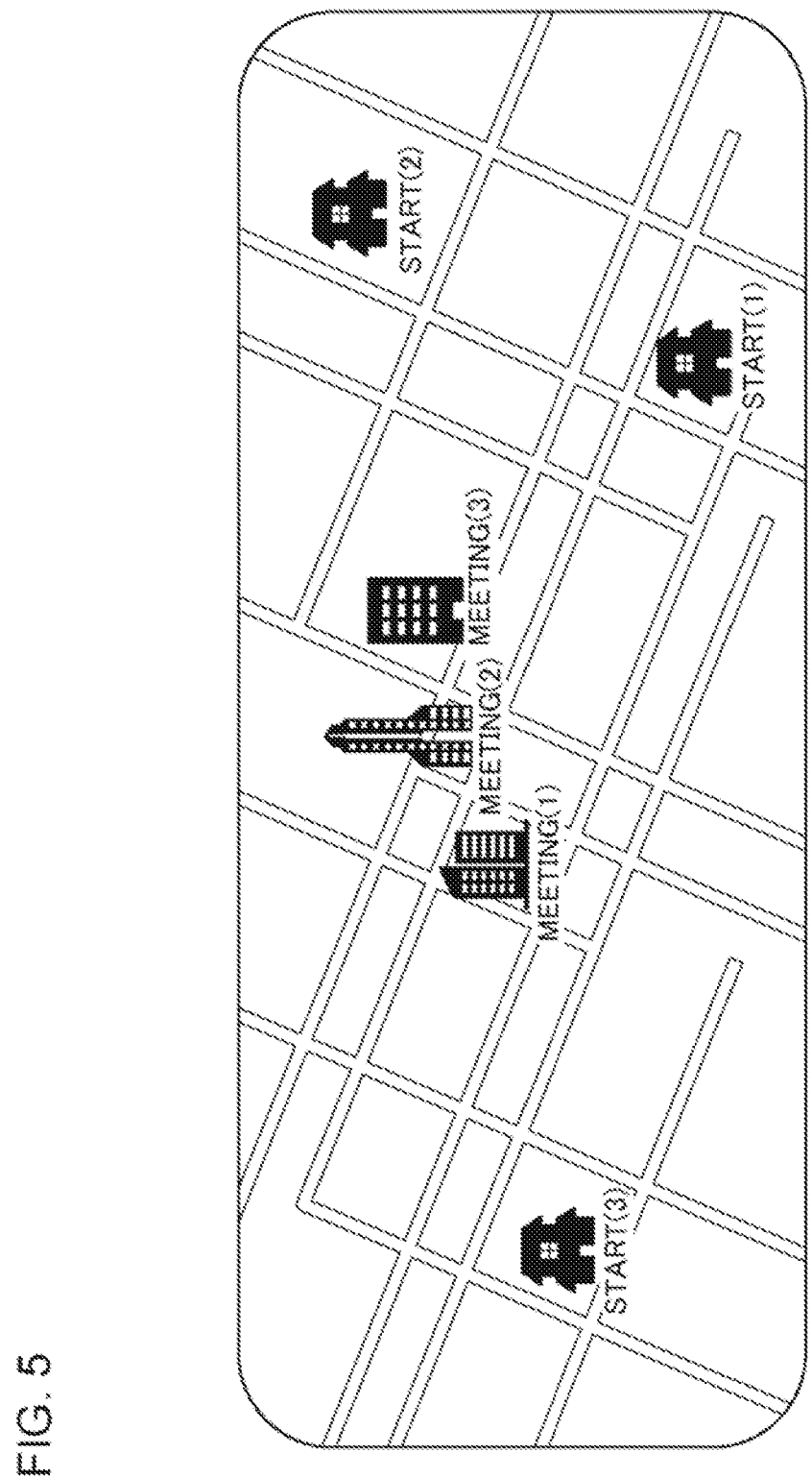
FIG. 5 is a diagram schematically illustrating an example of a screen output by the retrieval apparatus according to the present example embodiment.

In addition, as illustrated in FIG. 5, the client terminal may display an image of a map on which a plurality of specified starting points [STARTs (1) to (3) in the diagram] and the positions of one or a plurality of facilities selected as one or a plurality of meeting places [MEETINGS (1) to (3) in the diagram].

Figure 6:
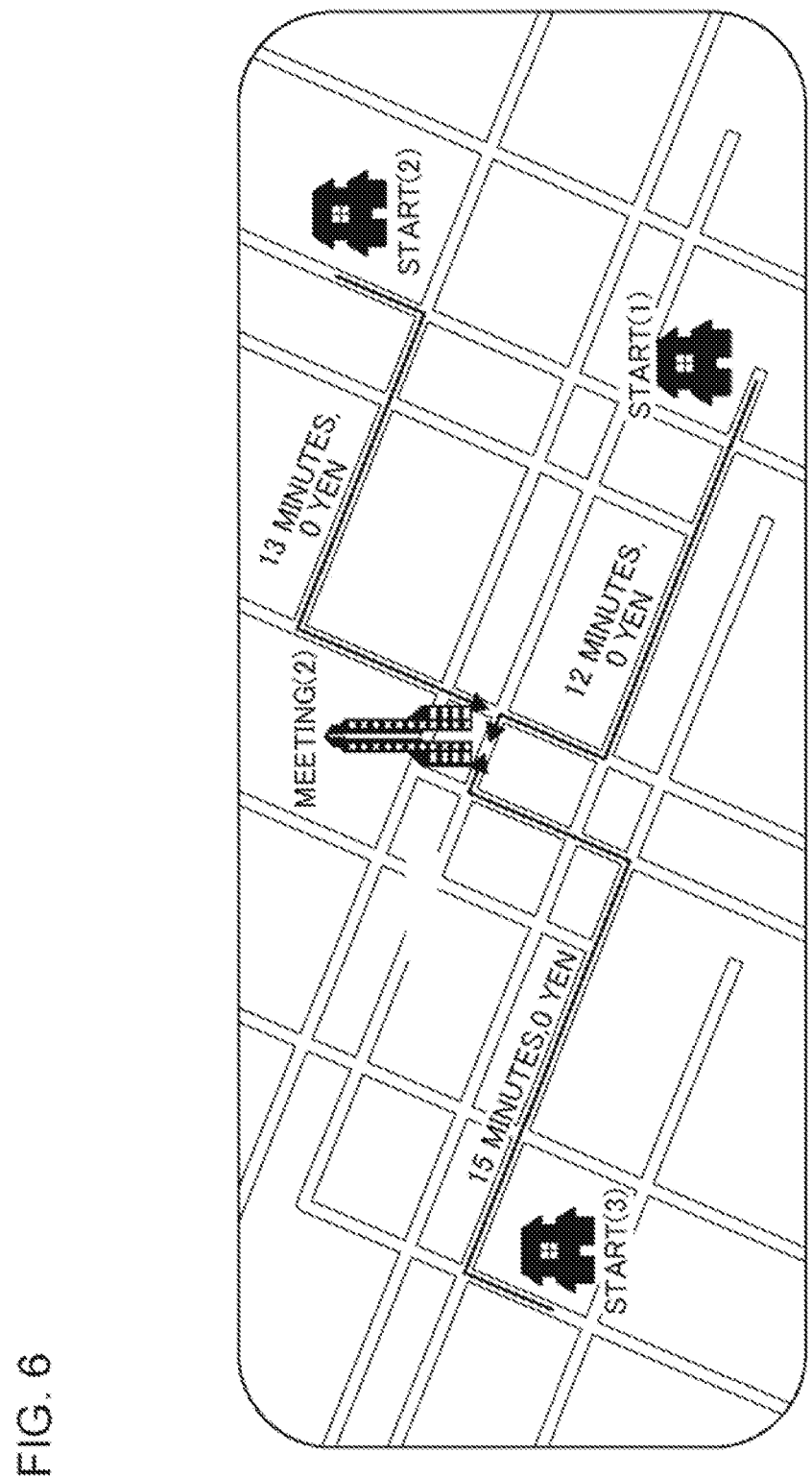
FIG. 6 is a diagram schematically illustrating an example of a screen output by the retrieval apparatus according to the present example embodiment.
Figure 7:
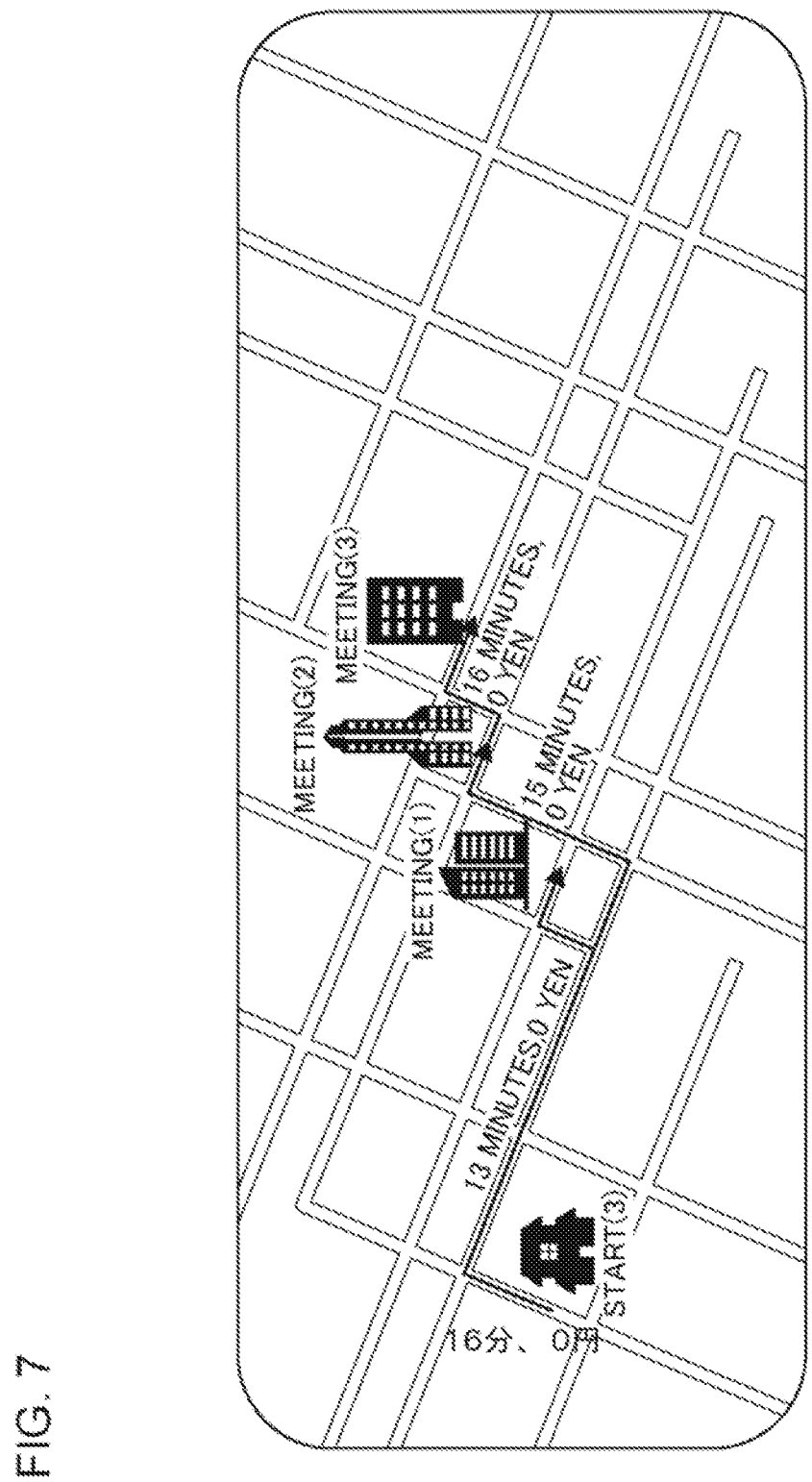
FIG. 7 is a diagram schematically illustrating an example of a screen output by the retrieval apparatus according to the present example embodiment.

Note that while not being illustrated in FIG. 5, an optimum route from each starting point to each facility, the travel distance, the travel time, the cost, and/or the like may be further displayed. However, when the number of starting points and the number of facilities selected as meeting places increase, the number of pairs of a starting point and a meeting place increases and the amount of information displayed for each pair, such as an optimum route, a travel distance, a travel time, and a cost, also increases. As a result, the amount of information on the screen becomes excessive, and confirmation of an output result becomes difficult. Then, for example, when one facility is selected on the image illustrated in FIG. 5, an optimum route between the selected facility and each of a plurality of starting points, the travel distance, the travel time, the cost, and/or the like may be displayed, as illustrated in FIG. 6. Similarly, for example, when one starting point is selected on the image illustrated in FIG. 5, an optimum route between the selected starting point and each of a plurality of facilities selected as one or a plurality of meeting places, the travel distance, the travel time, the cost, and/or the like may be displayed, as illustrated in FIG. 7.

Figure 8:
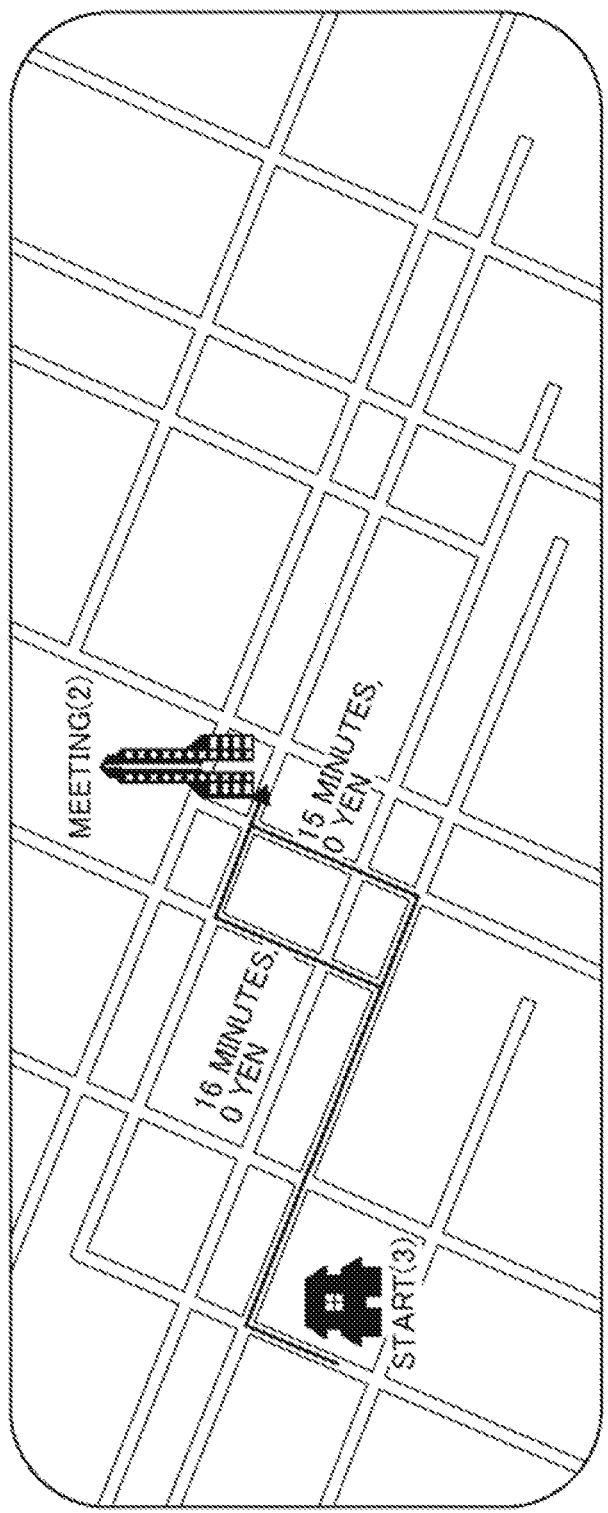
FIG. 8 is a diagram schematically illustrating an example of a screen output by the retrieval apparatus according to the present example embodiment.

Further, for example, when one facility and one starting point are selected on the image illustrated in FIG. 5, an optimum route and an alternative route between the selected facility and the selected starting point, the travel distance, the travel time, the cost, and/or the like of each route may be displayed, as illustrated in FIG. 8.

Figure 9:
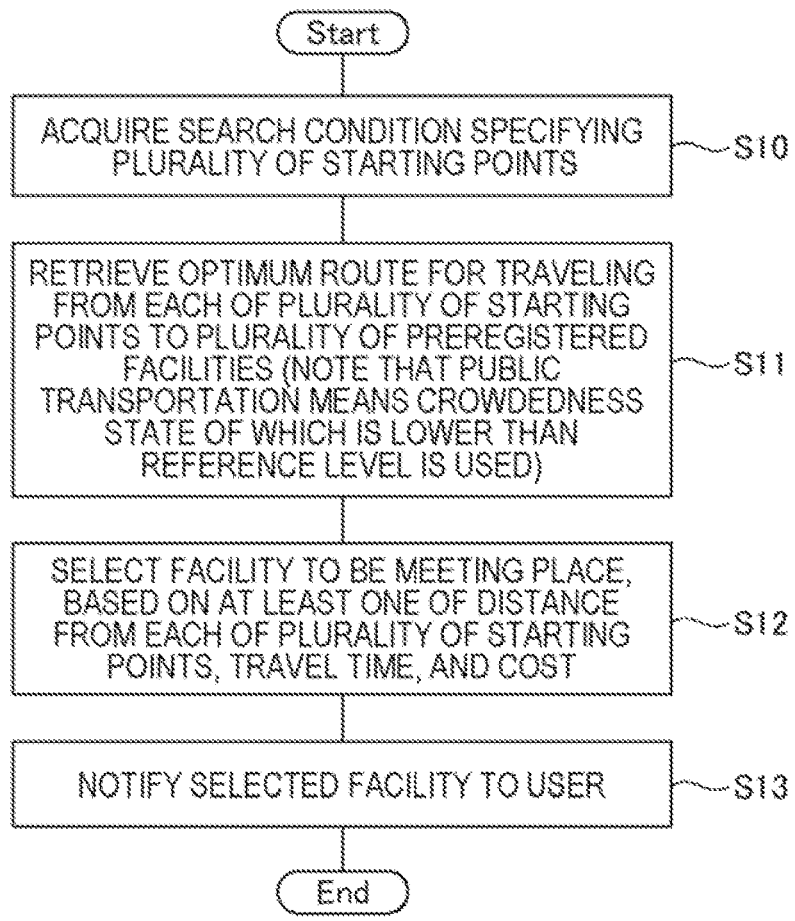
FIG. 9 is a flowchart illustrating an example of a flow of processing in the retrieval apparatus according to the present example embodiment.

Next, an example of a flow of processing in the retrieval apparatus 10 will be described by using a flowchart in FIG. 9. Note that the purpose of the description is to describe a "flow" of the processing. Details of each type of processing have been described above and therefore are omitted as appropriate.

First, the search condition acquisition unit 11 acquires a search condition specifying a plurality of starting points from the client terminal (S10). A travel means, a meeting date and time, and the like may be further specified by the search condition.

Next, the selection unit 12 retrieves an optimum route for traveling from each of the plurality of starting points to each of a plurality of preregistered facilities (S11). In retrieval of an optimum route, the selection unit 12 takes the crowdedness state of a public transportation means into consideration. First, based on acquired information indicating the crowdedness state of a public transportation means, the selection unit 12 determines a public transportation means the crowdedness state of which is lower than the reference level. Then, the selection unit 12 computes an optimum route for traveling from each of the plurality of starting points to each of the plurality of preregistered facilities when the public transportation means the crowdedness state of which is lower than the reference level is used. By the processing, an optimum route when a public transportation means the crowdedness state of which is lower than the reference level is used is determined for each pair of each of the plurality of starting points and each of the plurality of preregistered facilities, and the travel distance, the travel time, and the cost of the route is computed, as illustrated in FIG. 4.

A facility being a target of the optimum route retrieval processing in S11 may be all of the plurality of preregistered facilities. In addition, the selection unit 12 may extract part of the plurality of preregistered facilities by a predetermined means as a candidate of a meeting place and set the extracted part to be a target of the processing.

Next, the selection unit 12 selects a facility to be a meeting place, based on at least one of the travel distance, the travel time, and the cost of the aforementioned determined optimum route for traveling from each of the plurality of starting points to each of the plurality of preregistered facilities (S12). The selection unit 12 may select a facility as a meeting place from among the plurality of preregistered facilities, a degree of variation in at least one of the travel distance, the travel time, and the cost for traveling from each of the plurality of starting points to the facility satisfying the predetermined condition. For example, which of a travel distance, a travel time, and a cost has priority may be specified by the search condition. Then, the selection unit 12 may select a facility to be a meeting place, based on a degree of variation in the specified item.

For example, a degree of variation is indicated by a range of values (the difference between a maximum value and a minimum value). As illustrated in FIG. 4, for each preregistered facility, the travel distance, the travel time, the cost, and the like for traveling from each of the plurality of starting points to the facility are computed. For each preregistered facility, the selection unit 12 computes a degree of variation in the travel distance for traveling from each of the plurality of starting points to the facility, a degree of variation in the travel time for traveling from each of the plurality of starting points to the facility, or a degree of variation in the cost for traveling from each of the plurality of starting points to the facility. Then, the selection unit 12 selects a facility for which the computation result satisfies the predetermined condition as a meeting place. Examples of a facility satisfying the predetermined condition include "a facility with a degree of variation (such as a range of values) being equal to or less than a threshold value" and "a facility with a degree of variation (a range of values) being included in a predetermined number of degrees of variation in ascending order.

Next, the notification unit 13 notifies the selected facility to a user (S13). The notification unit 13 transmits information indicating one or a plurality of facilities selected as one or a plurality of meeting places to the client terminal. The client terminal outputs the acquired information to the display.

For example, the client terminal may display an image in which information (such as a name, an address, a phone number, and/or a thumbnail image) about one or a plurality of facilities selected as one or a plurality of meeting places are displayed in list form. In addition, as illustrated in FIG. 5, the client terminal may display an image of a map on which a plurality of specified starting points [STARTs (1) to (3) in the diagram] and the positions of one or a plurality of facilities [MEETINGs (1) to (3) in the diagram] selected as one or a plurality of meeting places.

Advantageous Effects

The retrieval apparatus 10 according to the present example embodiment can retrieve, from among a plurality of preregistered facilities, a suitable facility as a meeting place from a plurality of starting points and notify the facility to a user. Then, when a public transportation means the crowdedness state of which is lower than a reference level is used, the retrieval apparatus 10 can retrieve a facility best equalizing a burden among all persons in terms of distance, time, or cost and can select the facility as a meeting place and notify the facility to the user.

Thus, the retrieval apparatus 10 can retrieve a meeting place (facility) satisfying the user needs for "a facility best equalizing a burden among all persons in terms of distance, time, or cost for traveling by using a public transportation means the crowdedness state of which is lower than a reference level" and notify the place to the user.

Further, the retrieval apparatus 10 enables specification of a travel means for each person starting from each of a plurality of starting points. Such a retrieval apparatus 10 enables retrieval of a meeting place (facility) satisfying the aforementioned needs under a condition better suited to an actual state.

Further, the retrieval apparatus 10 enables a user himself/herself to register a facility being a candidate of a meeting place. Such a retrieval apparatus 10 further improves convenience of a retrieval service.

Second Example Embodiment

A selection unit 12 according to the present example embodiment extracts part of a plurality of preregistered facilities as one or a plurality of candidates of a meeting place, based on a plurality of starting points specified by a search condition. Then, the selection unit 12 performs the first processing and the second processing described in the first example embodiment with the extracted facilities as processing targets and selects one or a plurality of facilities suitable as one or a plurality of meeting places from among the extracted facilities.

The processing of extracting part of a plurality of preregistered facilities as one or a plurality of candidates of a meeting place, based on a plurality of starting points specified by a search condition, will be described.

The selection unit 12 determines a meeting candidate area, based on the plurality of starting points. Then, the selection unit 12 extracts a facility existing in the meeting candidate area as a candidate of a meeting place.

Extraction Processing Example 1

For example, the selection unit 12 may determine the inside of a polygon acquired by connecting a plurality of starting points as a meeting candidate area.

Extraction Processing Example 2

In addition, by moving and/or scaling an area in a predetermined shape (such as a circle or a polygon) on a map, the selection unit 12 may find a state (a position and a size) including all of the plurality of starting points and minimizing the area of the area and may determine an area in the state as a meeting candidate area.

Extraction Processing Example 3

In addition, the selection unit 12 may compute a reference point, based on a plurality of starting points and determine an area being centered on the reference point and having a predetermined shape and a predetermined size as a meeting candidate area. The reference point is a point equidistant from each of the plurality of starting points but may be another point. Examples of a predetermined shape include a circle and a polygon but are not limited thereto. A predetermined size may be predetermined or may be set and changed by a user. For example, a circular area or a polygonal area being centered on the reference point and having a predetermined size is determined as a meeting candidate area.

Note that in the example, the selection unit 12 may compute at least one of the travel distance (such as the shortest travel distance), the travel time (such as the shortest travel time), and the cost (such as the minimum cost) for traveling from each of the plurality of starting points to a meeting candidate area by using a public transportation means the crowdedness state of which is lower than a reference level and correct the reference point or the meeting candidate area, based on the computation result. Specifically, the selection unit 12 corrects the reference point or the meeting candidate area in such a way as to best equalize the travel distance, the travel time, or the cost for traveling from each of the plurality of starting points to the meeting candidate area.

For example, the selection unit 12 may move the reference point or the meeting candidate area toward a starting point with a longer travel distance compared with other starting points and move the reference point or the meeting candidate area away from a starting point with a shorter travel distance compared with other starting points. Further, the selection unit 12 may move the reference point or the meeting candidate area toward a starting point with a longer travel time compared with other starting points and move the reference point or the meeting candidate area away from a starting point with a shorter travel time compared with other starting points. Further, the selection unit 12 may move the reference point or the meeting candidate area toward a starting point with a higher cost compared with other starting points and move the reference point or the meeting candidate area away from a starting point with a lower cost compared with other starting points.

Figure 10:
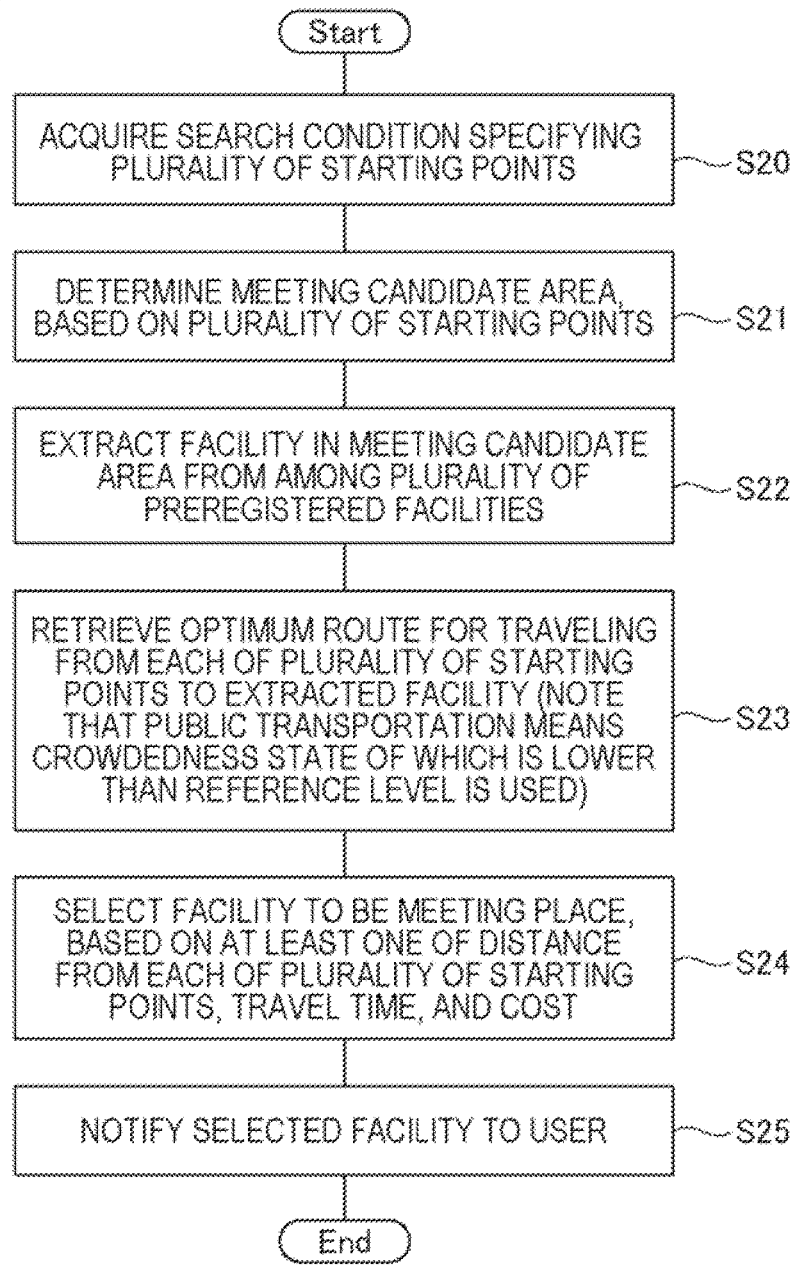
FIG. 10 is a flowchart illustrating an example of a flow of processing in the retrieval apparatus according to the present example embodiment.

Next, an example of a flow of processing in the retrieval apparatus 10 will be described by using a flowchart in FIG. 10. Note that the purpose of the description is to describe a "flow" of the processing. Details of each type of processing have been described above and therefore are omitted as appropriate.

First, the search condition acquisition unit 11 acquires a search condition specifying a plurality of starting points from the client terminal (S20). A travel means, a meeting date and time, a purpose of travel, and the like may be further specified by the search condition.

Next, the selection unit 12 determines a meeting candidate area, based on the plurality of starting points (S21). For example, the selection unit 12 determines a meeting candidate area, based on one of the aforementioned extraction processing examples 1 to 3.

Next, the selection unit 12 extracts a facility existing in the meeting candidate area from among a plurality of preregistered facilities (S22).

Next, the selection unit 12 retrieves an optimum route for traveling from each of the plurality of starting points to each of the plurality of extracted facilities (S23). The selection unit 12 takes the crowdedness state of a public transportation means into consideration in retrieval of an optimum route. First, the selection unit 12 determines a public transportation means the crowdedness state of which is lower than the reference level, based on acquired information indicating the crowdedness state of a public transportation means. Then, the selection unit 12 computes an optimum route for traveling from each of the plurality of starting points to each of the plurality of extracted facilities by using the public transportation means the crowdedness state of which is lower than the reference level. By the processing, for each pair of each of the plurality of starting points and each of the plurality of extracted facilities, an optimum route for traveling by using the public transportation means the crowdedness state of which is lower than the reference level is determined, and the travel distance, the travel time, and the cost of the route is computed, as illustrated in FIG. 4.

Next, the selection unit 12 selects a facility suitable as a meeting place, based on at least one of the travel distance, the travel time, and the cost of the aforementioned determined optimum route for traveling from each of the plurality of starting points to each of the plurality of extracted facilities (S24). The selection unit 12 may select a facility as a meeting place from among the extracted facilities, a degree of variation in at least one of the travel distance, the travel time, and the cost for traveling from each of the plurality of starting points to the facility satisfying a predetermined condition. For example, which of a travel distance, a travel time, and a cost has priority may be specified by the search condition. Then, the selection unit 12 may select a facility to be a meeting place, based on a degree of variation in the specified item.

For example, a degree of variation is indicated by a range of values (the difference between a maximum value and a minimum value). As illustrated in FIG. 4, for each extracted facility, the travel distance, the travel time, the cost, and the like for traveling from each of the plurality of starting points to the facility are computed. For each extracted facility, the selection unit 12 computes a degree of variation in the travel distance for traveling from each of the plurality of starting points to the facility, a degree of variation in the travel time for traveling from each of the plurality of starting points to the facility, or a degree of variation in the cost for traveling from each of the plurality of starting points to the facility. Then, the selection unit 12 selects a facility for which the computation result satisfies the predetermined condition as a meeting place. Examples of a facility satisfying the predetermined condition include "a facility with a degree of variation (such as a range of values) being equal to or less than a threshold value" and "a facility with a degree of variation (range of values) included in a predetermined number of degrees of variation in ascending order."

Next, the notification unit 13 notifies the selected facility to a user (S25). The notification unit 13 transmits information indicating one or a plurality of facilities selected as one or a plurality of meeting places to the client terminal. The client terminal outputs the acquired information to the display.

For example, the client terminal may display an image in which information (such as a name, an address, a phone number, and/or a thumbnail image) about one or a plurality of facilities selected as one or a plurality of meeting places is displayed in list form. In addition, as illustrated in FIG. 5, the client terminal may display an image of a map on which a plurality of specified starting points [STARTs (1) to (3) in the diagram] and the positions of one or a plurality of facilities selected as one or a plurality of meeting places [MEETINGS (1) to (3) in the diagram].

The remaining configuration of the retrieval apparatus 10 is similar to that according to the first example embodiment. The retrieval apparatus 10 according to the present example embodiment provides advantageous effects similar to those of the first example embodiment. Further, the retrieval apparatus 10 can extract part of a plurality of preregistered facilities as a candidate of a meeting place and, based on an optimum route between the candidate and each of a plurality of starting points, the travel distance, the travel time, the cost, and the like, select one or a plurality of facilities suitable as one or a plurality of meeting places from among the plurality of extracted facilities. Such a retrieval apparatus 10 can decrease the number of facilities being targets of processing of computing an optimum route, a travel distance, a travel time, a cost, and the like and therefore can lighten a processing burden on the computer.

Further, the retrieval apparatus 10 can extract a candidate of a meeting place from among a plurality of preregistered facilities, based on "a plurality of starting points." Therefore, the retrieval apparatus 10 can extract the candidate in such a way that a facility suitable as a meeting place is included.

Third Example Embodiment

A selection unit 12 according to the present example embodiment includes another means for extracting part of a plurality of preregistered facilities as a candidate of a meeting place in addition to or in place of the means described in the second example embodiment.

According to the present example embodiment, each of a plurality of preregistered facilities is registered in association with information indicating the purpose of use of the facility, as illustrated in FIG. 11. Then, a search condition acquisition unit 11 acquires a search condition further specifying the purpose of use of a facility. Specifically, the search condition acquisition unit 11 acquires a search condition specifying the purpose of use of a facility in addition to a plurality of starting points in S10 in FIGS. 9 and S20 in FIG. 10.

The selection unit 12 extracts one or a plurality of facilities associated with a purpose of use specified by a search condition as one or a plurality of candidates of a meeting place from among a plurality of preregistered facilities. When the retrieval apparatus 10 has the function described in the second example embodiment, the selection unit 12 extracts one or a plurality of facilities existing in a meeting candidate area and satisfying the purpose of use (facilities associated with the purpose of use specified by the search condition) from among the plurality of preregistered facilities. Then, the selection unit 12 performs the first processing and the second processing described in the first example embodiment with the extracted facilities as processing targets and selects one or a plurality of facilities suitable as one or a plurality of meeting places from among the extracted facilities.

The remaining configuration of the retrieval apparatus 10 is similar to those according to the first and second example embodiments. The retrieval apparatus 10 according to the present example embodiment provides advantageous effects similar to those of the first and second example embodiments. Further, the retrieval apparatus 10 can retrieve a meeting place more suited to user needs (a facility further satisfying the purpose of use).

Fourth Example Embodiment

A search condition acquisition unit 11 according to the present example embodiment acquires a search condition further specifying a time period to be a meeting time. For example, a time period to be a meeting time may be specified in units such as morning or afternoon, may be specified in units of days, may be specified by a time period in one day (such as 10 hours to 12 hours), may be specified by a plurality of time periods apart from each other in one day (such as 10 hours to 12 hours or 16 hours to 18 hours), may be specified by a plurality of ranges in a plurality of days (10 hours to 12 hours in one day out of October 1 to 5), or may be specified by another technique.

Then, a selection unit 12 selects an optimum meeting time from the specified time period, based on at least one of the crowdedness state of a public transportation means, the crowdedness states of a plurality of preregistered facilities, and a schedule of a person starting from each of a plurality of starting points.

Meeting Time Selection Example 1

After selecting a facility to be a meeting place, based on the techniques described in the first to third example embodiments, the selection unit 12 acquires information indicating the crowdedness state of the facility.

Information indicating the crowdedness state of a facility may be information indicating the reservation state of the facility on a meeting date specified by the search condition. For example, the information can be acquired from a server managing reservations of the facility. In addition, information indicating the crowdedness state of a facility may be information indicating the crowdedness state of the facility for each time period and being found from past records (such as information indicating an hourly crowdedness state).

The selection unit 12 determines a time period in which the facility is least crowded in the time period specified by the search condition. Then, the selection unit 12 may determine any time in the determined time period as a meeting time. In addition, the selection unit 12 may determine a time period in which the crowdedness state of the facility is equal to or lower than a reference level in the time period specified by the search condition. Then, the selection unit 12 may determine any time in the determined time period as a meeting time.

In this example, the selection unit 12 may select a meeting time for each facility selected as a meeting place.

Meeting Time Selection Example 2

The selection unit 12 acquires a schedule of a person starting from each of a plurality of starting points. For example, the selection unit 12 may acquire the schedule from a server managing the schedule. In this case, identification information of each of meeting persons is input into the search condition. The selection unit 12 acquires a schedule of a person identified by the identification information.

The selection unit 12 determines a time period in which a schedule of every person is clear in the time period specified by the search condition. Then, the selection unit 12 may determine any time in the determined time period as a meeting time.

Meeting Time Selection Example 3

The selection unit 12 determines a time period in which the crowdedness state of a public transportation means satisfies a predetermined condition in the time period on the date specified by a search condition. The predetermined condition is the least crowded time period in the specified time period on the date specified by the search condition or a time period the crowdedness state of which is lower than a reference level. Then, the selection unit 12 may determine any time in the determined time period as a meeting time.

For example, after selecting a facility to be a meeting place, based on the techniques described in the first to third example embodiments, the selection unit 12 may determine a public transportation means included in an optimum route for traveling to the facility from each of a plurality of starting points. Then, based on the crowdedness state of the determined public transportation means, the selection unit 12 may determine a meeting time by the aforementioned technique.

In addition, after determining a meeting candidate area by using the technique described in the second example embodiment, the selection unit 12 may determine a public transportation means to be used for traveling to the meeting candidate area from a specified starting point. Then, based on the crowdedness state of the determined public transportation means, the selection unit 12 may determine a meeting time by the aforementioned technique.

Note that the selection unit 12 may compute a starting time from each of a plurality of starting points after determining a meeting time. Then, the notification unit 13 may notify the starting time to a user. For example, the starting time may be set to a time going back the travel time from the meeting time.

The remaining configuration of the retrieval apparatus 10 is similar to those of the first to third example embodiments. The retrieval apparatus 10 according to the present example embodiment provides advantageous effects similar to those of the first to third example embodiments. Further, the retrieval apparatus 10 can compute and notify a meeting time preferable for a user. Furthermore, the retrieval apparatus 10 can compute and notify a starting time for meeting at the meeting time for each starting position. The retrieval apparatus 10 according to the present example embodiment can further improve convenience.

Modified Examples

Modified examples applicable to the first to fourth example embodiments will be described below.

Modified Example 1

In a modified example 1, identification information of each meeting person is input into a search condition. Then, a user specifying the search condition performs input for specifying one facility from among one or a plurality of facilities (one or a plurality of facilities notified by a notification unit 13) selected as one or a plurality of meeting places. Further, the user performs instruction input for delivering an invitation for inviting a person specified by the search condition to the meeting.

In accordance with the aforementioned delivery instruction for an invitation, the notification unit 13 notifies information (such as a name, an address, and/or a phone number) about a facility specified by the user to a person specified by the search condition. In addition to the information of the facility, a meeting date, a meeting time, a starting time, an optimum route, a comment input by the user, and the like may be notified.

While examples of the notification means include an electronic mail, push notification by an application, and notification on a user page after a login to an application or a website, the means is not limited thereto.

Modified Example 2

A meeting place is selected on the assumption that a public transportation means the crowdedness state of which is lower than a reference level is used by using information indicating the crowdedness state of a public transportation means in the first to fourth example embodiments. In a modified example 2, a meeting place is selected by performing similar processing without the assumption that a public transportation means the crowdedness state of which is lower than a criterion is used.

Modified Example 3

In a modified example 3, in association with at least part of a plurality of preregistered facilities, a URL of a reservation site managing reservations of the facility is stored in a storage unit 14. Then, a screen notifying a facility selected as a meeting place (such as FIGS. 5 to 8) is configured in such a way as to allow selection of one facility on the screen and, when input for transitioning to a reservation site is performed, allow access to the reservation site, based on the URL.

Screen Example

FIG. 12 illustrates an example of a screen provided by the retrieval apparatus 10. A screen example of "SELECT PURPOSE" is an example of a user interface (UI) for specifying the purpose of use of a facility to be a meeting place as a search condition. A screen example of "SELECT STARTING POINT" is an example of a UI for specifying a plurality of starting points as a search condition. A screen example of "SPECIFY DATE AND TIME" is an example of a UI for specifying a meeting date and a time period as a search condition.

A screen example of "SELECT OPTION" is an example of a UI for specifying other items as a search condition. When STANDARD is selected in DESTINATION SEARCH, the radius of a circle being a meeting candidate area (a circular area being centered on a reference point and having a predetermined size) described in the second example embodiment is set to a predetermined standard value. On the other hand, by selecting SEARCH RADIUS and inputting a desired value, the radius of a circle being a meeting candidate area can be customized. In ROUTE SEARCH, an item to have priority in selection of a meeting place is specified.

A screen example of "SELECT DESTINATION" is an example of a UI for notifying one or a plurality of facilities selected as one or a plurality of meeting places by the selection unit 12 to a user. A screen example of "SELECT ROUTE" is an example of a UI for notifying a route for traveling from each of a plurality of starting points to a selected meeting place.

Note that "acquisition" herein includes at least one item out of "an apparatus getting data stored in another apparatus or a storage medium (active acquisition)" such as making a request or an inquiry to another apparatus and receiving a response and readout by accessing another apparatus or a storage medium, in accordance with a user input or a program instruction, or "an apparatus inputting data or information output from another apparatus to the apparatus (passive acquisition)" such as reception of distributed (or, for example, transmitted or push notified) data and acquisition by selection from received data or information, in accordance with a user input or a program instruction, and "generating new data by data editing (such as conversion to text, data rearrangement, partial data extraction, or file format change) and acquiring the new data."

The whole or part of the example embodiments disclosed above may also be described as, but not limited to, the following supplementary notes.

1. A retrieval apparatus including:
    a search condition acquisition unit that acquires a search condition specifying a plurality of starting points;
    a selection unit that selects, from among a plurality of preregistered facilities, one or a plurality of facilities to be one or a plurality of meeting places from the plurality of starting points, based on the plurality of starting points and a crowdedness state of a public transportation unit; and
    a notification unit that notifies a facility selected as the meeting place to a user.
2. The retrieval apparatus according to 1, wherein
    the selection unit selects a facility to be the meeting place, further based on at least one of a travel distance, a travel time, and a cost for traveling from each of the plurality of starting points to each of the plurality of preregistered facilities.
3. The retrieval apparatus according to 2, wherein,
    when a public transportation means a crowdedness state of which is lower than a reference level is used, the selection unit computes at least one of a travel distance, a travel time, and a cost for traveling from each of the plurality of starting points to each of the plurality of preregistered facilities.
4. The retrieval apparatus according to 2 or 3, wherein
    the selection unit selects a facility as the meeting place from among the plurality of preregistered facilities, a degree of variation in at least one of a travel distance, a travel time, and a cost for traveling from each of the plurality of starting points to the facility satisfying a predetermined condition.
5. The retrieval apparatus according to any one of 1 to 4, wherein
    the selection unit
        determines a meeting candidate area, based on the plurality of starting points, and
        selects a facility to be the meeting place from among the plurality of preregistered facilities existing in the meeting candidate area.
6. The retrieval apparatus according to 5, wherein
    the selection unit computes a reference point, based on the plurality of starting points and determines an area being centered on the reference point and having a predetermined shape and a predetermined size as the meeting candidate area.
7. The retrieval apparatus according to 5 or 6, wherein
    the selection unit corrects the reference point or the meeting candidate area, based on a computation result of at least one of a travel distance, a travel time, and a cost for traveling from each of the plurality of starting points to the meeting candidate area.
8. The retrieval apparatus according to 7, wherein,
    when a public transportation means a crowdedness state of which is lower than a reference level is used, the selection unit computes at least one of a travel distance, a travel time, and a cost for traveling from each of the plurality of starting points to the meeting candidate area.
9. The retrieval apparatus according to any one of 1 to 8, wherein
    the search condition acquisition unit acquires the search condition further specifying a purpose of use of a facility,
    information indicating a purpose of use is registered in association with each of the plurality of preregistered facilities, and
    the selection unit selects a facility to be the meeting place from among the plurality of preregistered facilities associated with a purpose of use specified by the search condition.
10. The retrieval apparatus according to any one of 1 to 9, wherein
    the search condition acquisition unit acquires the search condition further specifying a time period to be a meeting time, and
    the selection unit selects a meeting time in the time period, based on at least one of a crowdedness state of a public transportation means, crowdedness states of the plurality of preregistered facilities, and a schedule of a person starting from each of the plurality of starting points.
11. The retrieval apparatus according to any one of 1 to 10, wherein
    the notification unit outputs a map indicating the plurality of starting points and a position of a facility selected as the meeting place.

12. A retrieval method including, by a computer:
acquiring a search condition specifying a plurality of starting points;
selecting, from among a plurality of preregistered facilities, one or a plurality of facilities to be one or a plurality of meeting places from the plurality of starting points, based on the plurality of starting points and a crowdedness state of a public transportation means; and
notifying a facility selected as the meeting place to a user.

13. A program causing a computer to function as:
a search condition acquisition unit that acquires a search condition specifying a plurality of starting points;
a selection unit that selects, from among a plurality of preregistered facilities, one or a plurality of facilities to be one or a plurality of meeting places from the plurality of starting points, based on the plurality of starting points and a crowdedness state of a public transportation means; and
a notification unit that notifies a facility selected as the meeting place to a user.

REFERENCE SIGNS LIST

10 Retrieval apparatus
11 Search condition acquisition unit
12 Selection unit
13 Notification unit
14 Storage unit
1A Processor
2A Memory
3A Input-output I/F
4A Peripheral circuit
5A Bus

What is claimed is:

1. A retrieval apparatus comprising:
at least one memory configured to store one or more instructions; and
at least one processor configured to execute the one or more instructions to:
acquire a search condition specifying a plurality of starting points;
based on the plurality of starting points and a crowdedness state of public transportation, select, from among a plurality of preregistered facilities, one or a plurality of facilities as a meeting place from the plurality of starting points; and
notify a user of the facility selected as the meeting place.

2. The retrieval apparatus according to claim 1, wherein the processor is further configured to execute the one or more instructions to select the facility as the meeting place, further based on at least one of a travel distance, a travel time, and a cost for traveling from each of the plurality of starting points to each of the plurality of preregistered facilities.

3. The retrieval apparatus according to claim 2, wherein, when public transportation means a crowdedness state of which is lower than a reference level is used, the processor is further configured to execute the one or more instructions to, in a case that the crowdedness state of public transportation to be used is lower than a reference level, compute at least one of a travel distance, a travel time, and a cost for traveling from each of the plurality of starting points to each of the plurality of preregistered facilities.

4. The retrieval apparatus according to claim 2, wherein the processor is further configured to execute the one or more instructions to select a facility satisfying a predetermined condition as the meeting place, the predetermined condition concerning a degree of variation in at least one of a travel distance, a travel time, and a cost for traveling from each of the plurality of starting points to the facility.

5. The retrieval apparatus according to claim 1, wherein the processor is further configured to execute the one or more instructions to
determine a meeting candidate area based on the plurality of starting points, and
select a facility as the meeting place from among the plurality of preregistered facilities existing in the meeting candidate area.

6. The retrieval apparatus according to claim 5, wherein the processor is further configured to execute the one or more instructions to compute a reference point based on the plurality of starting points and determine an area being centered on the reference point and having a predetermined shape and a predetermined size as the meeting candidate area.

7. The retrieval apparatus according to claim 6, wherein the processor is further configured to execute the one or more instructions to correct the reference point or the meeting candidate area based on a computation result of at least one of a travel distance, a travel time, and a cost for traveling from each of the plurality of starting points to the meeting candidate area.

8. The retrieval apparatus according to claim 7, wherein, the processor is further configured to execute the one or more instructions to, in a case that the crowdedness state of public transportation to be used is lower than a reference level, compute at least one of a travel distance, a travel time, and a cost for traveling from each of the plurality of starting points to the meeting candidate area.

9. The retrieval apparatus according to claim 1, wherein each of the plurality of preregistered facilities is associated with information indicating a purpose of use, and
the processor is further configured to execute the one or more instructions to
acquire the search condition further specifying a purpose of use of a facility, and
select the facility as the meeting place from among the plurality of preregistered facilities associated with the purpose of use specified by the search condition.

10. The retrieval apparatus according to claim 1, wherein the processor is further configured to execute the one or more instructions to
acquire the search condition further specifying a time period to be a meeting time, and
select a meeting time in the time period, based on at least one of a crowdedness state of public transportation, crowdedness states of the plurality of preregistered facilities, and a schedule of a person starting from each of the plurality of starting points.

11. The retrieval apparatus according to claim 1, wherein the processor is further configured to execute the one or more instructions to output a map indicating the plurality of starting points and a position of the facility selected as the meeting place.

12. A retrieval method by a computer, comprising:
acquiring a search condition specifying a plurality of starting points;

based on the plurality of starting points and a crowdedness state of public transportation, selecting, from among a plurality of preregistered facilities, one or a plurality of facilities as a meeting place from the plurality of starting points; and notifying a user of the facility selected as the meeting place.

13. A non-transitory storage medium storing a program causing a computer to:

acquire a search condition specifying a plurality of starting points;

based on the plurality of starting points and a crowdedness state of public transportation, select, from among a plurality of preregistered facilities, one or a plurality of facilities as a meeting place from the plurality of starting points; and notify a user of the facility selected as the meeting place to a user.

* * * * *